(12) United States Patent
Greenley

(10) Patent No.: US 7,997,526 B2
(45) Date of Patent: Aug. 16, 2011

(54) MOVEABLE WINGS ON A FLYING/HOVERING VEHICLE

(76) Inventor: Peter Greenley, Lake Geneva, WI (US)

( * ) Notice: Subject to any disclaimer, the term of this patent is extended or adjusted under 35 U.S.C. 154(b) by 825 days.

(21) Appl. No.: 12/045,207

(22) Filed: Mar. 10, 2008

(65) Prior Publication Data

US 2008/0223994 A1 Sep. 18, 2008

Related U.S. Application Data

(60) Provisional application No. 60/894,285, filed on Mar. 12, 2007.

(51) Int. Cl.
*B64C 27/22* (2006.01)
*B64C 15/12* (2006.01)
*B64C 3/38* (2006.01)
*A63H 27/127* (2006.01)

(52) U.S. Cl. .......... 244/7 B; 244/7 C; 244/12.4; 244/48; 244/56; 446/37; 446/58

(58) Field of Classification Search .................. 244/7 R, 244/7 A, 7 B, 7 C, 12.4, 48, 55, 56; 416/99, 416/146 R; 446/37, 58
See application file for complete search history.

(56) References Cited

U.S. PATENT DOCUMENTS

| | | | | |
|---|---|---|---|---|
| 2,328,786 A * | 9/1943 | Crowder | ........ | 244/7 B |
| 2,444,781 A * | 7/1948 | Leonard | ........ | 244/7 B |
| 2,479,125 A * | 8/1949 | Leonard | ........ | 244/7 B |
| 2,511,025 A * | 6/1950 | Tucker et al. | ...... | 244/7 A |
| 3,254,725 A * | 6/1966 | Higgins | ........ | 416/149 |
| 5,085,315 A | 2/1992 | Sambell | | |
| 6,276,633 B1 | 8/2001 | Balayn et al. | | |
| 6,719,244 B1 | 4/2004 | Gress | | |
| 7,118,066 B2 * | 10/2006 | Allen | ........ | 244/7 B |
| 2005/0230519 A1 * | 10/2005 | Hurley | ........ | 244/7 C |

* cited by examiner

*Primary Examiner* — Tien Dinh
*Assistant Examiner* — Joseph W Sandersom
(74) *Attorney, Agent, or Firm* — Adam K Sacharoff; Much Shelist

(57) ABSTRACT

The present invention includes an embodiment defined as a flying vehicle having a pair of wings and a transition assembly partially housed within each of the pair of wings. The transition assembly has ends rotatable with respect to each other and separately secured to the wing in which the end is housed. The transition assembly has a first position defined as having each wing positioned at an angle offset from a substantial horizontal orientation and oriented in an opposite direction from the other wing. When the transition assembly is in the first position the vehicle spins and will fly in a substantially hovering vertical orientation. The transition assembly has a second position defined as having each wing positioned in a substantial horizontal position. When the transition assembly is in the second position the vehicle will fly in a substantially horizontal orientation.

11 Claims, 15 Drawing Sheets

MOVEABLE WINGS ON A FLYING/HOVERING VEHICLE

CROSS REFERENCE TO RELATED APPLICATIONS

The present application claims the benefit of U.S. Provisional 60/894,285 filed on Mar. 12, 2007.

BACKGROUND OF THE INVENTION

The background of the invention relates to flying vehicles. Flying vehicles have been developed for many years however flying vehicles have taken the position of either being a conventional vehicle such as an airplane or an unconventional vehicle such as a flying saucer or helicopter. The ability to have both types of flying conditions in a single embodiment is not well known or defined. There is thus a need to provide a single vehicle that is capable of both conventional and unconventional flying. Such a need has been addressed by the present invention.

SUMMARY OF THE INVENTION

The present invention provides for numerous embodiments, of which of few are summarized. Numerous other advantages and features of the invention will become readily apparent from the detailed description of the invention and the embodiments thereof, from the claims, and from the accompanying drawings.

In a first embodiment there is provided a flying vehicle having a pair of wings, each of which include a propeller and a motor for driving the propeller. The flying vehicle also includes a transition assembly partially housed within each of the pair of wings. The transition assembly having ends rotatable with respect to each other and each end is separately secured to the wing in which the end is housed. The transition assembly has at least a first and a second position.

The first position is defined as having each wing oriented to an angle offset from a substantially horizontal orientation and in a different direction from the other wing. When the transition assembly is in the first position and the propellers are rotating, the entire vehicle will spin and will fly in a substantially hovering vertical orientation, meaning the vehicle rises off the ground and hovers at a height determined by the amount of power provided to the propellers. The second position is defined as having each wing oriented to the substantial horizontal position and in a substantially similar direction, such that when the transition assembly is in the second position and the propellers are rotating, the vehicle will fly in a substantially horizontal orientation.

The offset angle defined by the first position may be about 40-90° from the substantial horizontal position. Since both wings are oriented in a different direction, one wing and the propeller secured thereto is oriented about 80-180° from the other wing.

The transition assembly may take different forms depending on various embodiments. Some of these transition assemblies are disclosed and include the ability to manually move the transition assembly from one position to the other, mechanically moving the transition assembly by a delayed timing mechanism or a remote control. In addition, the transition assembly may in some instances be moved from one position to the other and back again.

In one transition assembly, a method of mechanically moving the transition assembly from the first position to the second position is provided. The mechanical transition occurs while the vehicle is in the substantially hovering vertical orientation, such that the vehicle transforms from the substantially hovering vertical orientation to fly in the substantially horizontal orientation. Similarly, the mechanical movement may be described in various embodiments.

In one instance the transition assembly may include a motor mechanism, a gear driven by the motor mechanism in at least a first direction, and a spur gear partially secured within each wing. Each spur gear is meshed to the gear such that the motor mechanism when operating rotates the wings in different directions with respect to the other wing. The motor mechanism may also drive the gear in two directions, such that the transition assembly is mechanically movable from the first position to the second position and from the second position to the first position.

In another instance the vehicle may include an elongated tail section extending through the vehicle and having a region near a portion thereof for rotatable connection with the wings. The region defined on the elongated tail section may also include a pair of posts extending outwardly from each side of the elongated tail section towards the wing connected thereto. Each wing will further including a channel for receiving the post. The channel includes ends to define a maximum angle of rotation for each wing. When positioned at one end of the channels, the wings are oriented at the substantially horizontal orientation and when positioned at the other end of the channels, the wings are oriented at the substantially hovering vertical orientation.

In yet another instance the vehicle includes an elongated tail section extending through the vehicle and having a region near a portion thereof for rotatable connection with the wings. The tail section has a first channel and a second channel both of which have openings to the region. The transition assembly could in this instance include a gear meshed to first and second spur gears. The spur gears are separately and partially secured within each wing, wherein the rotation of one wing causes the gear to rotate the other wing in an opposite direction with respect to the one wing. A flexible band is positioned in the first channel and has one end secured through the opening to a portion of the first spur gear and has the other end secured to a wall distal to the opening in the first channel. A string is positioned in the second channel and has one end secured through the opening to a portion of the second spur gear and has the other end secured to a suction cup. The suction cup being capable of being secured to a plate positioned to a wall distal to the opening in the second channel. When the suction cup is secured to the plate, the wings are rotated, and the flexible band is placed in tension. As the suction cup loses is grip on the plate, the flexible band will return the wings back to a horizontal position.

In another embodiment, the transition assembly may include a servo with a pin placed through an aperture defined on a hex rod plate; a cam arm is secured to the pin about the aperture on the hex rod plate such that the hex rod plate is captured between the servo and the cam arm, and thus when the servo operates the cam arm turns; a cam cover having an opening is mounted over the hex rod plate such that a hex rod defined by the hex rod plate extends through the opening; secured to the hex rod is a lock stop hex arm, wherein the cam cover is rotatable around the hex rod; a spring having two extension ends, one of the extension ends of the spring is inserted into a first extension end aperture on the lock stop hex arm; a head cover secured to the hex rod plate, the head cover having a second extension end aperture for receipt of the other extension end on the spring; a trigger pin is provided with a first trigger end, the first trigger end is inserted through a trigger opening defined on the cam cover such that the first trigger end is moveable when the servo turns the cam arm, a second trigger end is pivotally secured through a vertical slot defined on the head cover; a pair of flanges are positioned on the head cover and extend from the vertical slot to define an arm opening therebetween for receiving an arm defined by the lock stop hex arm; wherein when the transition assembly is moved to the first position, the cam cover and head cover rotate about the hex rod plate such that the arm defined by the lock stop hex arm is placed in the arm opening between the pair of flanges on the head cover and the arm is further positioned against the trigger pin placing the spring under tension, and wherein when the transition assembly is activated to move to the second position, the servo turns the cam arm pivoting the trigger pin such that it moves the arm out of the arm opening, whereby the spring causes the cam cover and head cover to rotate such that the transition assembly is moved to the second position. In addition, the lock stop hex arm may include a stop that is positioned against an end of one of the flanges to define the second position.

DESCRIPTION OF THE DRAWINGS

A fuller understanding of the foregoing may be had by reference to the accompanying drawings, wherein.

DETAILED DESCRIPTION OF THE EMBODIMENTS

Figure 1:
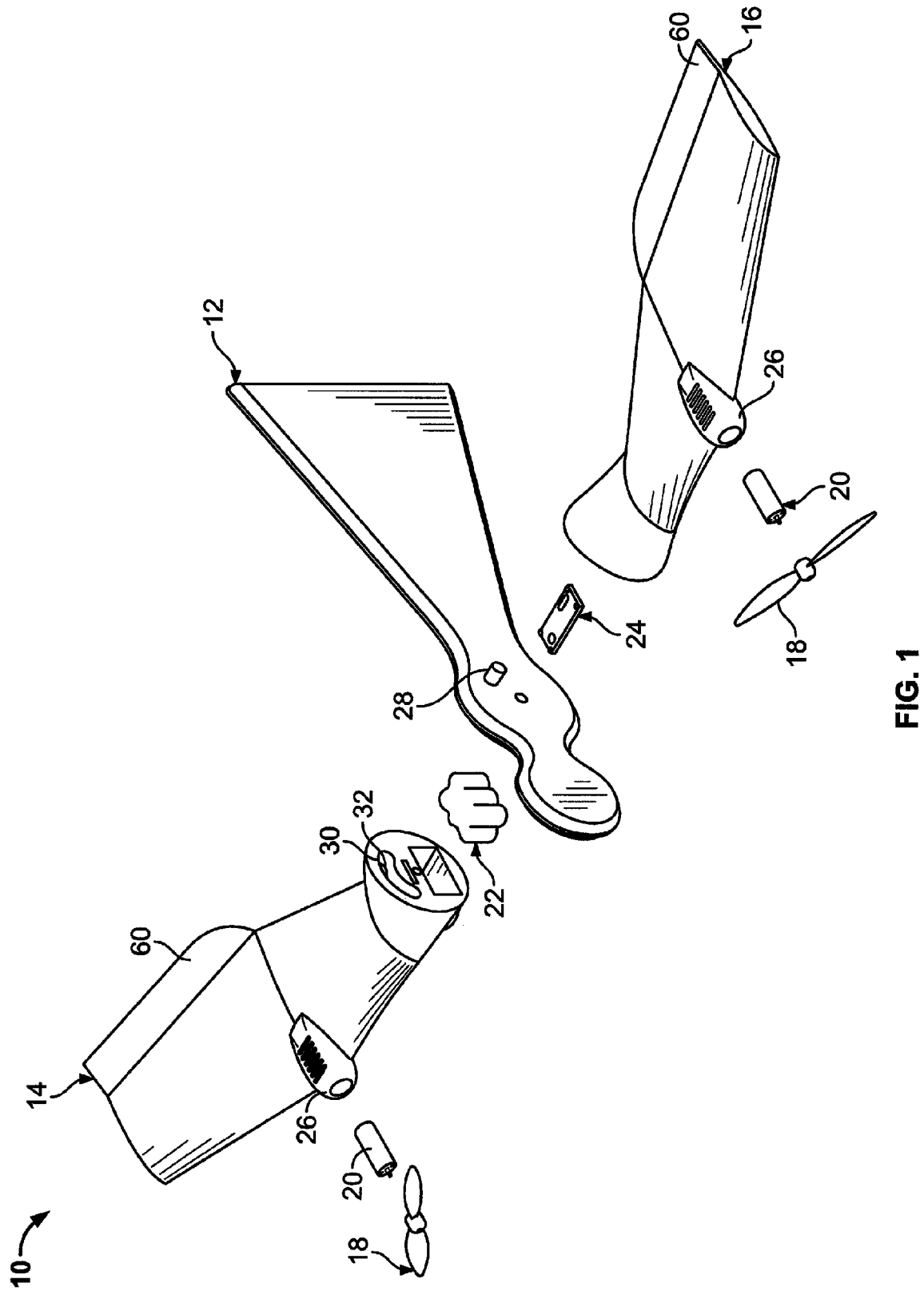
FIG. 1 is an exploded view of a flying vehicle in accordance to an embodiment of the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Referring now to FIG. 1, there is shown an exploded view of a flying vehicle 10 in accordance to one embodiment of the present invention. The flying vehicle 10 includes a tail section 12, a right wing section 14, a left wing section 16, a propeller 18 positioned on each wing section, a motor 20 also positioned on each wing section, a power pack 22, and a PC board 24.

The motor 20 is preferably embedded within a housing section 26 on each wing section. Internal channels (not shown) in the wings would run from the housing section to the power pack 22 and the PC board 24 to accommodate for electrical wiring. Each propeller 18 would be attached to the motor 20, such that the motor 20 is capable of spinning the propeller 18.

The tail section 12 may be part of an overall fuselage as shown or may be partitioned into separate sections. As illustrated in FIG. 1, the power pack 22 may be placed within one of the wing sections. The tail section 12 further includes pins 28 on either side thereof. The pins rest within curved apertures 30 defined in the wings opposite the pins location, when the wings are assembled with the tail section 12.

Figure 2A:
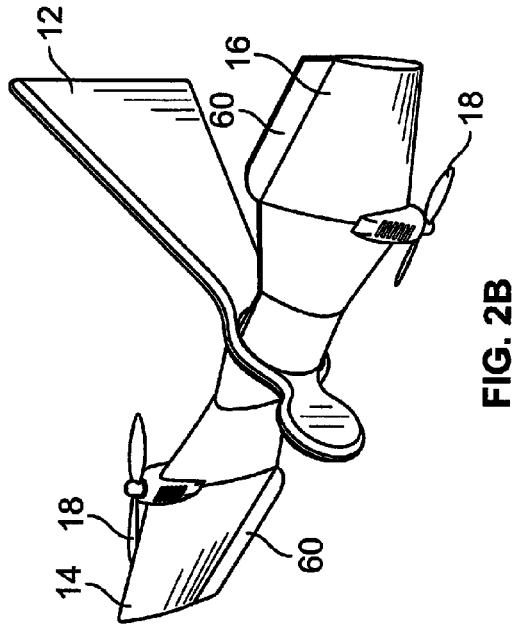
FIGS. 2a through 2d are various views of the flying vehicle with its wings in opposite positions for spinning the entire vehicle and creating a hovering craft.
Figure 2B:
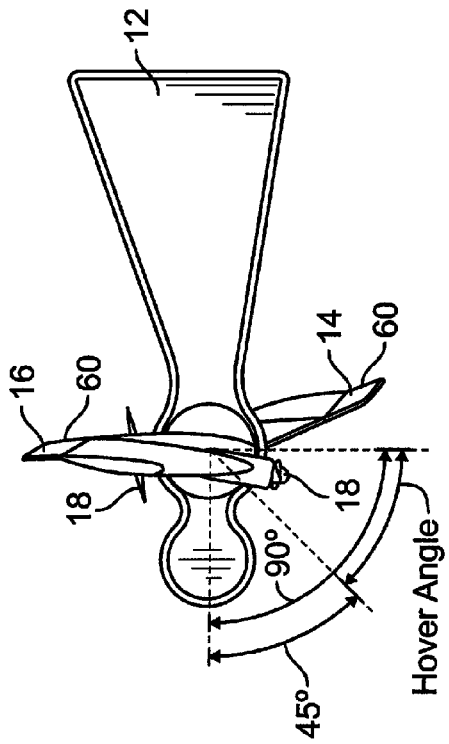
Figure 2C:
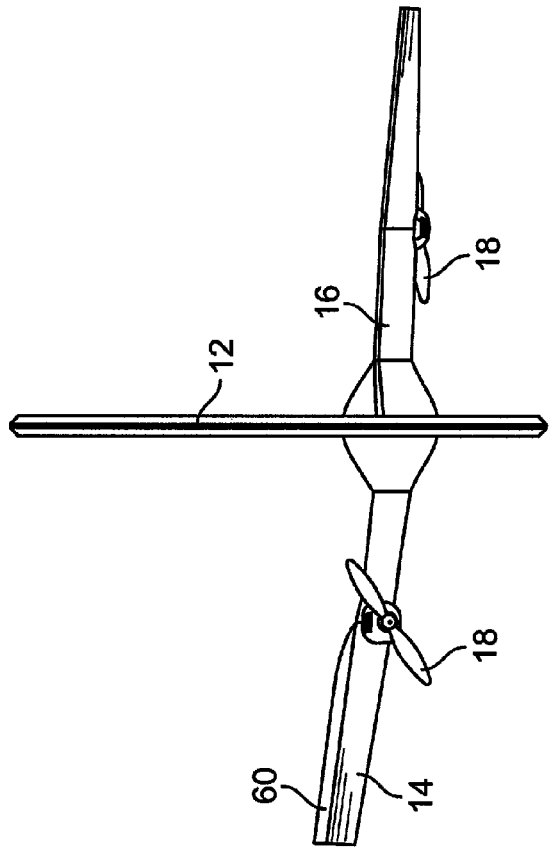
Figure 2D:
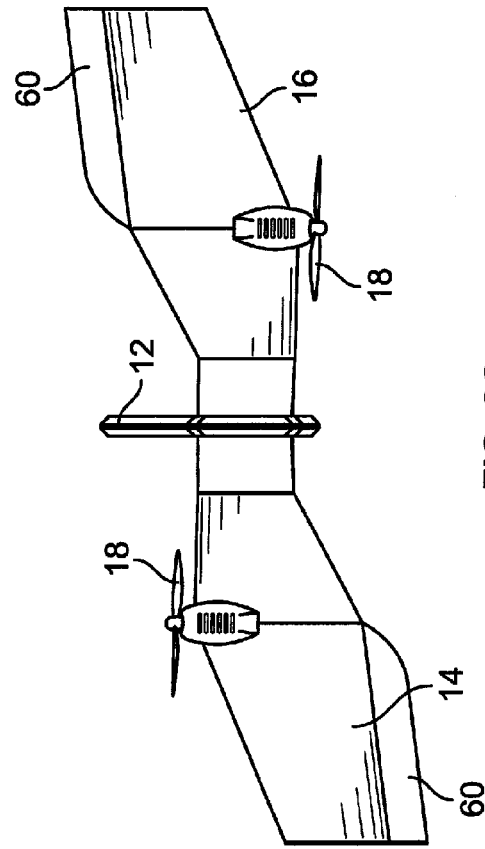
Figure 3A:
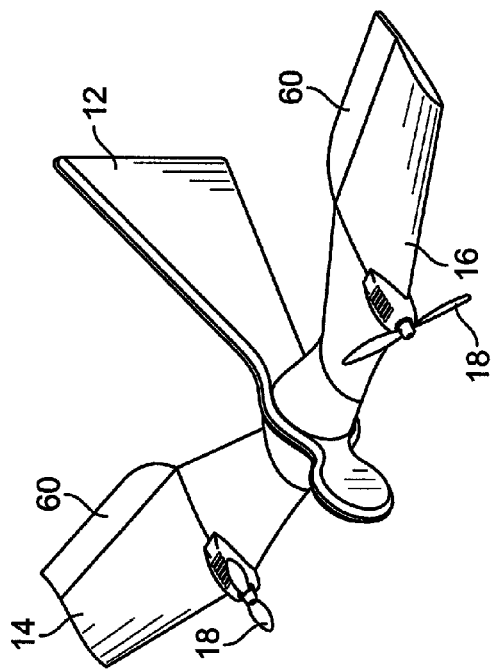
FIGS. 3a through 3d are various views of the flying vehicle with its wings oriented in the same direction for flying the vehicle like a conventional aircraft.
Figure 3C:
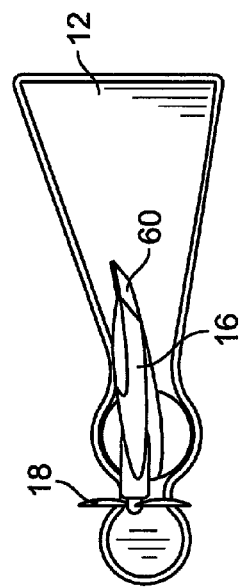
Figure 3B:
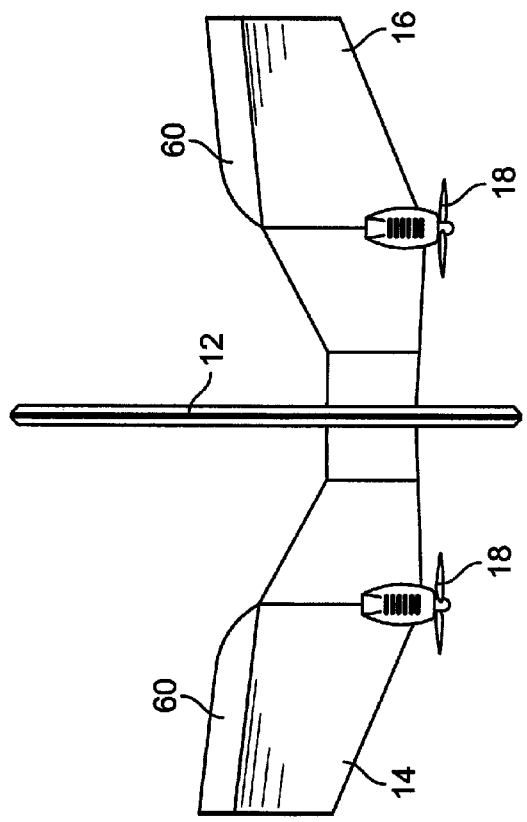
Figure 3D:
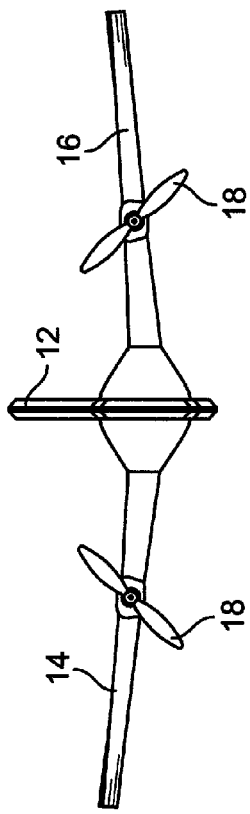

The flying vehicle 10 is either remote controlled or free flight, which can transform from a hovering action to a flying action by rotation of its wings with respect to each other. Referring now to FIGS. 2A through 2D, the flying vehicle 10 is shown in various hover position views. While in hover position, the wings 14 and 16 are rotated so that the propellers 18 face opposite positions. When rotating the opposite faced propellers 18 cause the wings 14 and 16 to spin in a circular motion and the wings now act as one propeller. This provides lift to the entire spinning vehicle 10. The vehicle 10 will in this instance spin, rise off the ground, and hover. As illustrated in FIG. 2D, the hovering angle may be such that each wing is rotated slightly less then 90° from the horizontal in opposite directions, such that the wings are rotated less than 180° with respect to one another.

The flying vehicle can also have its wings positioned in a conventional flying position, illustrated in FIGS. 3A through 3D. While in the flying position, the wings are rotated so that the propellers face the same direction. This causes the wings to fly like a traditional airplane.

Transitioning the flying vehicle from hovering to conventional flying can be a manual transition whereas the user rotates the wings and uses the item as either a hovering vehicle or a conventional flying airplane. As provided in the first embodiment, the user rotates the wings until the pins 28 move against or into a detent 32 defining the end of rotation. The detent 32 or ends of the aperture act as stops for the pins to prevent the wings from rotating too far. The detents 32 will also hold the wings in position until the user rotates the wings out of the detents. In addition, once positioned in the detents 32, the wings are positioned such that the vehicle is a hovering flying vehicle. The user can then rotate the wings back to the flying position, placing the pins in detents located at the other end of the aperture 30 and placing vehicle into a conventional flying vehicle.

Figure 4A:
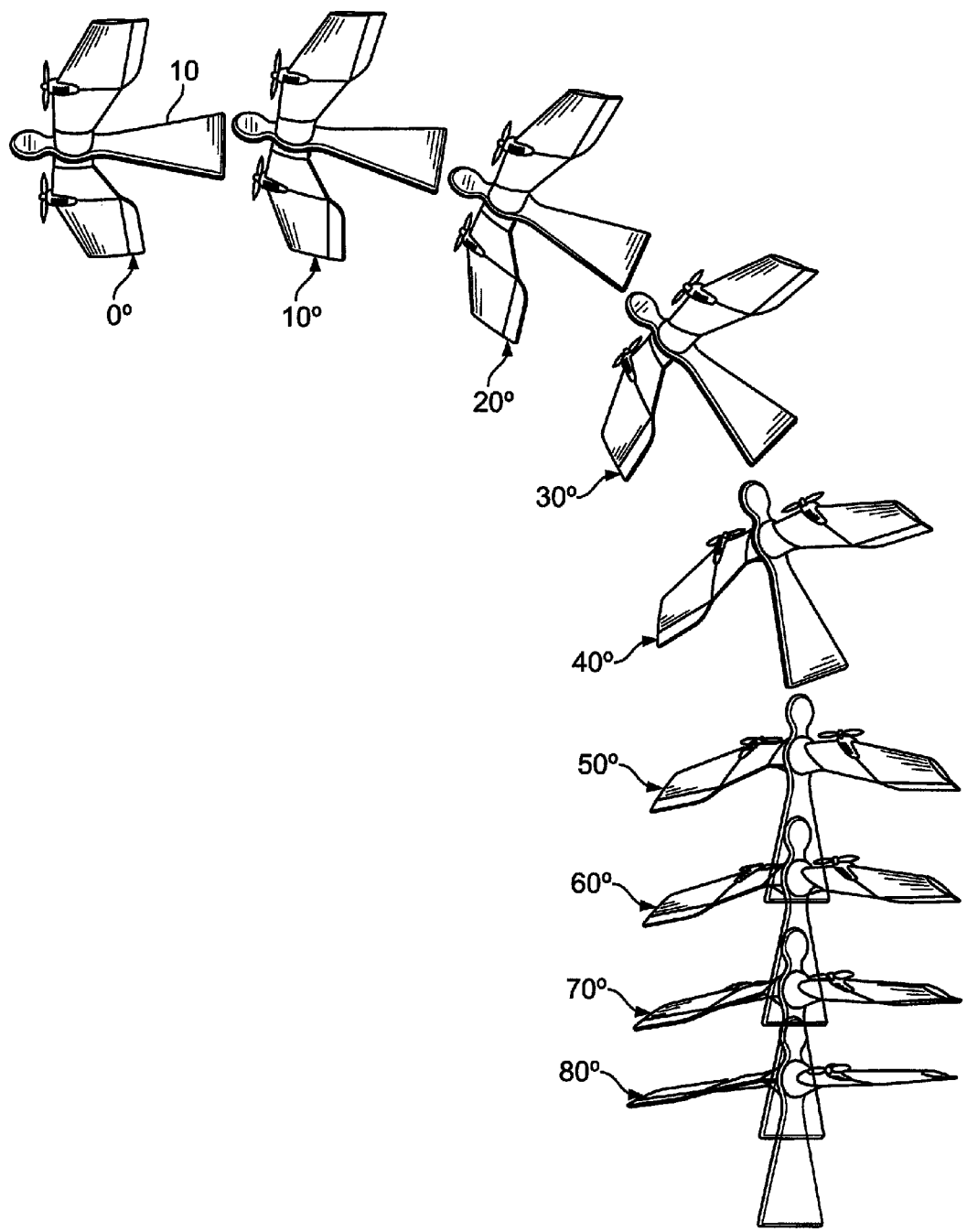
FIGS. 4a through 4b are views of the flying vehicle showing wing rotations from a spinning hover mode to a traditional flying mode in incremental degree changes.
Figure 4B:
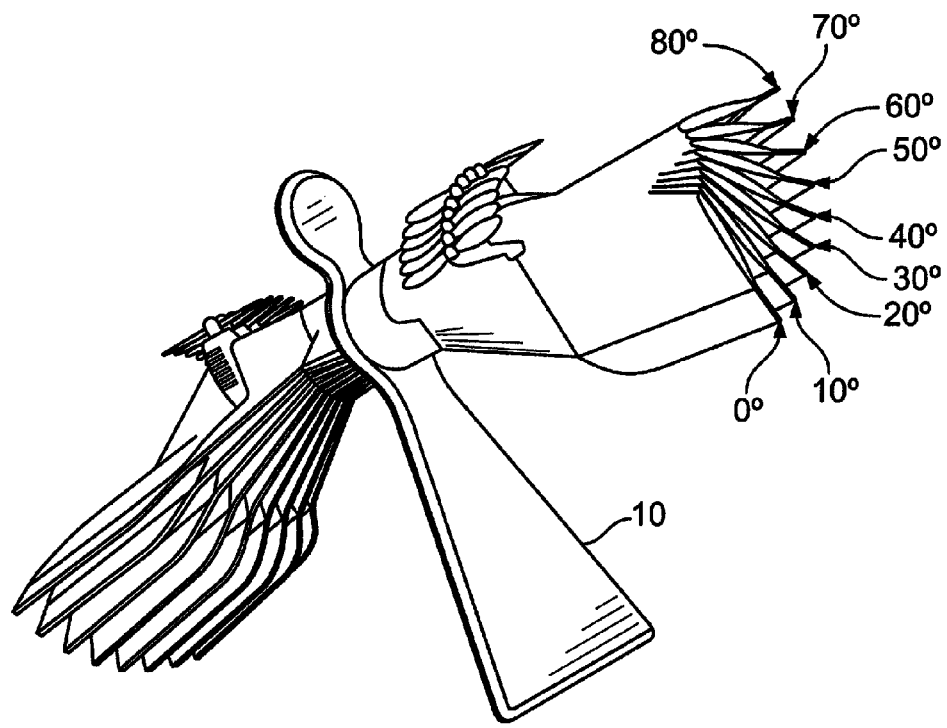

Referring now to FIGS. 4A and 4B, from the hover position, the nose of the vehicle 10 is pointed upwardly and the wings are extended and rotated such that the propellers face an angle about 80° degrees from the vertical position. It is contemplated by the present invention that the vehicle may hover with the propellers angled anywhere between 40 degrees to 90 degrees. In this position, with the propellers facing opposite directions, the vehicle will spin and lift off the ground into a hovering craft. As further explained in other embodiments, if the vehicle 10 has the ability to transform its position from a hovering vehicle to a flying vehicle, the wings will begin to rotate back to the horizontal or flying position. As shown in the illustration, once the wings begin to rotate, the vehicle will readjust itself such that eventually the vehicle is flying in a conventional manner, preferably when the wings are angled at zero degrees and the propellers are facing the same direction. Another aspect determined is that as the angle decreases, the spinning speed also decreases.

Figure 5:
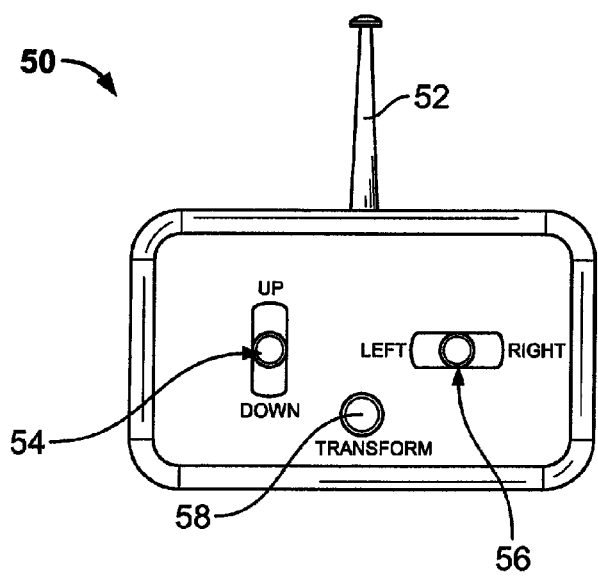
FIG. 5 shows a remote control.

As mentioned the transition from hovering to flying vehicle could also happen in mid air activated by a remote control, such as that illustrated in FIG. 5. A remote control 50 would include a transmitter to send signals from an antenna 52 to a receiver in the flying vehicle. The remote control could include a throttle 54 to control the ascending and descending of the vehicle by controlling the speed of both propellers. The remote control 50 may also include a differential steering 56 which raises the right and left propeller speeds. And further include a transform button or switch 58 that directs the vehicle to switch from the hovering mode to the flying mode. As shown in other embodiments, the ability to switch back from the flying mode to a hovering mode may also be provided.

Figure 6:
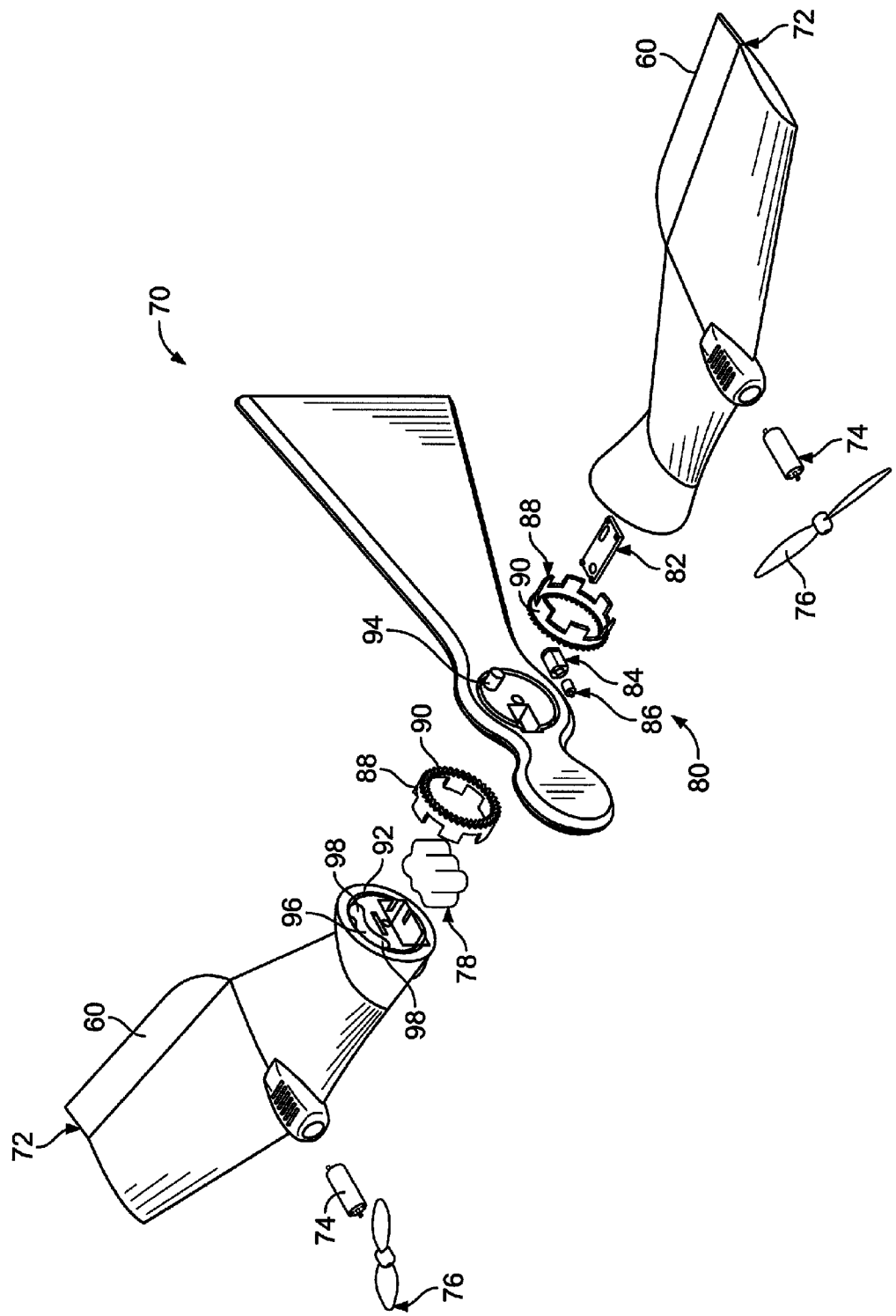
FIG. 6 is an exploded view of a second embodiment showing the use of a motor to control the movement of the wings controllable by a remote control or a timed IC.

Referring now to FIG. 6, a flying vehicle 70 is provided that includes a motor and gear assembly 80 that is controlled by a remote control, such as illustrated in FIG. 5. The flying vehicle includes a pair of wings 72 that house a motor 74 that is capable of driving a propeller 76. The wings further house a power pack 78 and PC board 82. The wings are connectable to a centered tail section 12. The vehicle 70 further includes a motor and gear assembly 80, which is defined as a pager motor 84 that drives a pager gear 86. The gear 86 rotates a pair of spur gears 88 that are separately secured to the wings. As the pager motor 84 drives the pager gear 86 in one direction, the wings rotate in opposite directions. As illustrated, the wings include circular channels 92 to accommodate the protruding edges of the spur gears 88, such that only the spur portion 90 is left to be meshed to the pager gear 86. In addition, the flying vehicle 70 includes pins 94 and corresponding apertures 96, the ends 98 of the apertures 96 act as stops for the pins 94 to prevent the wings from rotating too far.

Figure 7:
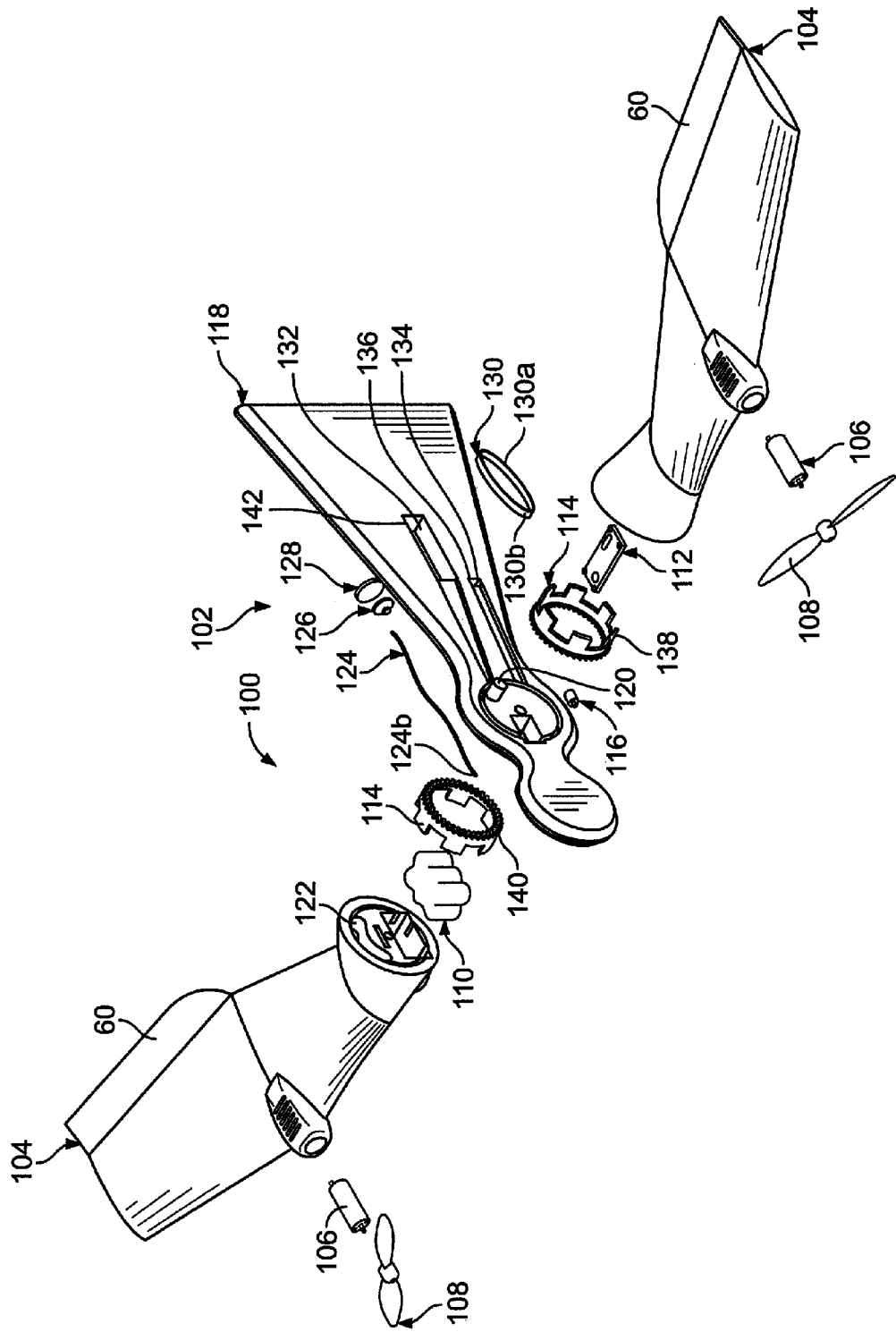
FIG. 7 shows an exploded view of a third embodiment showing the use of a suction transition assembly to control the movement of the wings.

The transition can also happen in mid air via a wind up assembly, suction cup or any other self-contained mechanical time delay mechanism (such as a timed IC). FIG. 7 shows a flying vehicle 100, which uses of a transition assembly 102 to control the transition. The flying vehicle 100 includes wings 104, motor 106, propellers 108, power pack 110 and PC board 112 are described herein. The vehicle 100 may also include a pair of spur gears 114 meshed to a gear 116. The wings 104 connect to a tail section 118, which includes one or more pins 120 that fit within apertures 122 on the wing. The pin and corresponding aperture work in concert to prevent the wings from rotating to far.

The transition assembly 102 includes a string 124, a suction cup 126, a plate 128, and a rubber band 130. The tail section 118 includes two bores 132 and 134 to accommodate the components of the transition assembly 102. The transition assembly 102 operates by securing one end 130a of the rubber band 130 at the back portion 136 of the first bore 134. The second end 130b of the rubber band is secured around one of the protrusions 138 of the spur gear 114. The end 124b of the string 124 is secured to one of the protrusions 140 of the opposite spur gear 114. The other end 124a of the string 124 is secured to the suction cup 126. The plate 128 is positioned or secured at the back 142 of the second bore 132.

The suction cup 126 is positioned against the plate by the user causing the wings to rotate into a hover mode and placing the rubber band 130 in tension. The user then operates the vehicle and over time, the suction cup will lose is grasp against the plate. As soon as the suction is lost, the rubber band 130 will snap back causing the wings to rotate into a flying mode.

Figure 8:
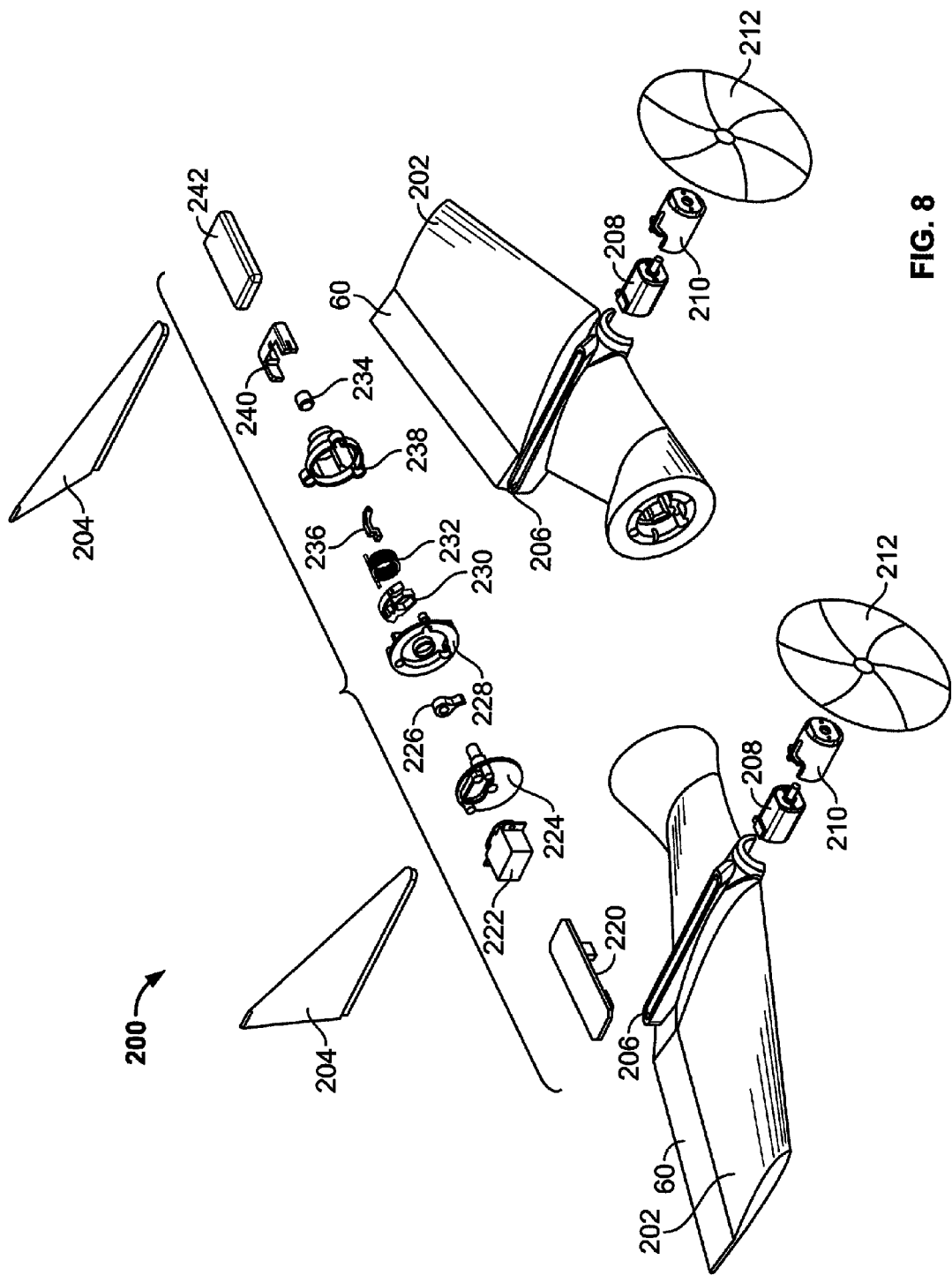
FIG. 8 shows an exploded view of a fourth embodiment showing the use of a transition assembly controllable by a remote control or a timed IC.

Referring now to FIG. 8, there is shown in an exploded view a single in air transition vehicle 200. The vehicle 200 would be remote controlled such that the vehicle could transition from a hover mode to a flying mode by a button or switch on the remove control (such as described above). The vehicle 200 does not include a centered tail section as described above but rather includes a pair of wings 202 that rotatably connect to each other such that one of the wings may rotate with respect to the other wing. Separate tail sections 204 are secured to a top portion 206 of each wing 202. Each wing 202 includes a motor 208, a motor cage 210 secured over the motor 208 and to the wing 202. A propeller 212 is attached to each motor 208. A transition assembly 214 is provided to facilitate the in air transition and will be further described below.

Figure 9A:
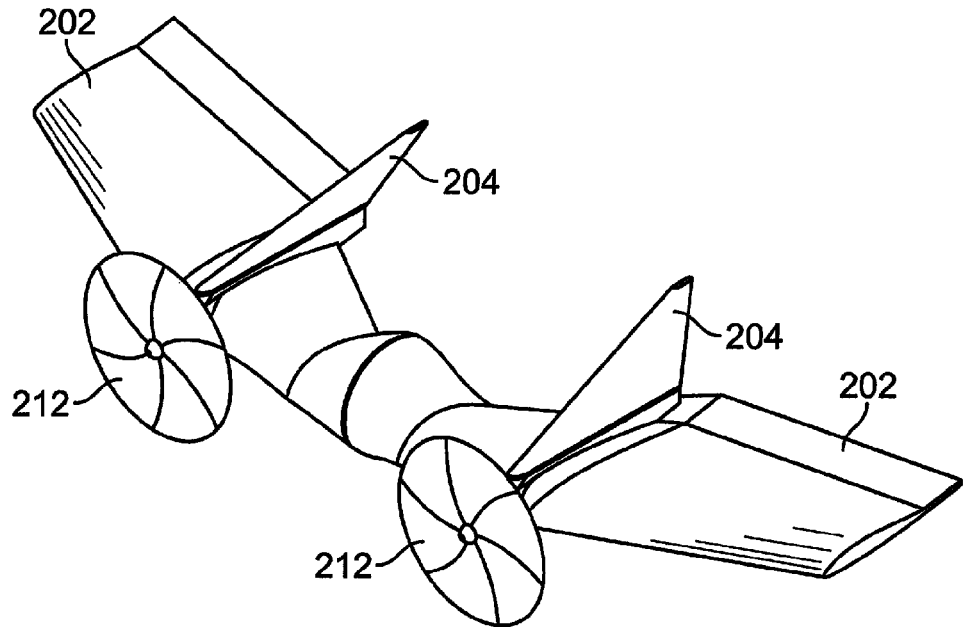
FIGS. 9A and 9B illustrate the vehicle of FIG. 8 in a flying mode and a hovering mode.
Figure 9B:
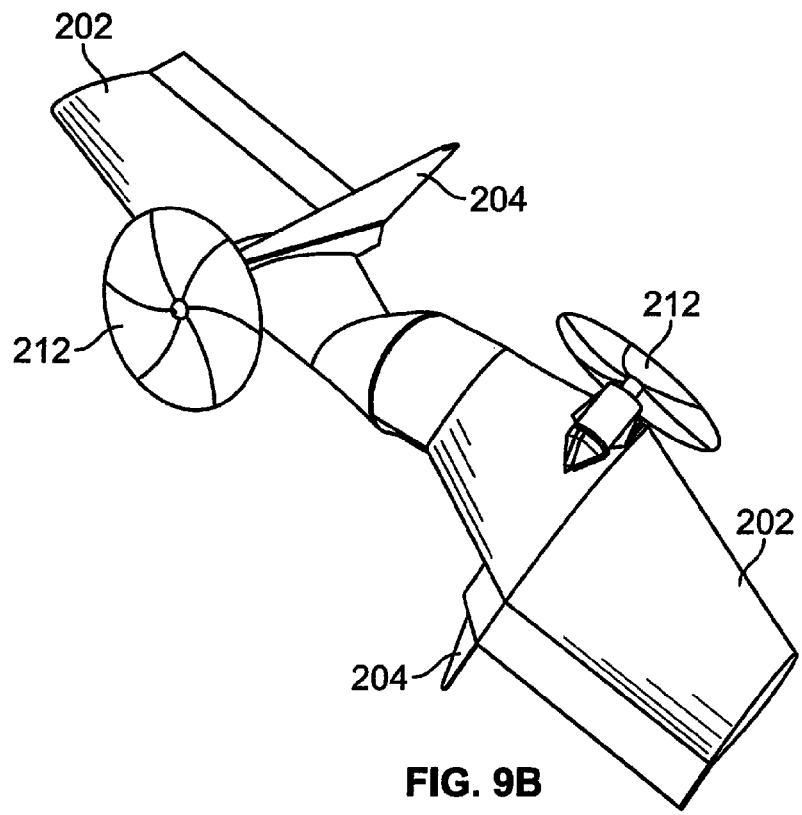
Figure 10:
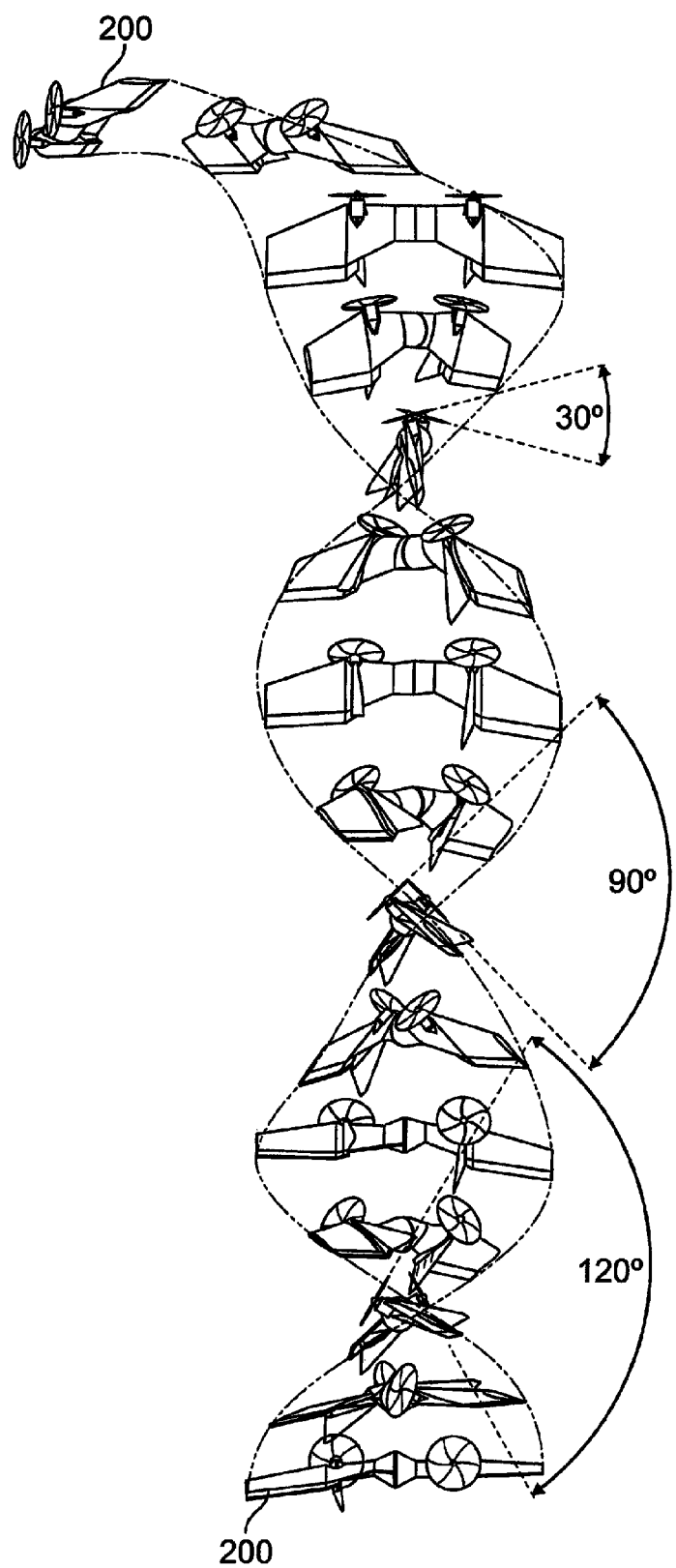
FIG. 10 illustrates the vehicle of FIG. 8 in various positions in its transiting mode from hovering to flying.
Figures 11, 12:
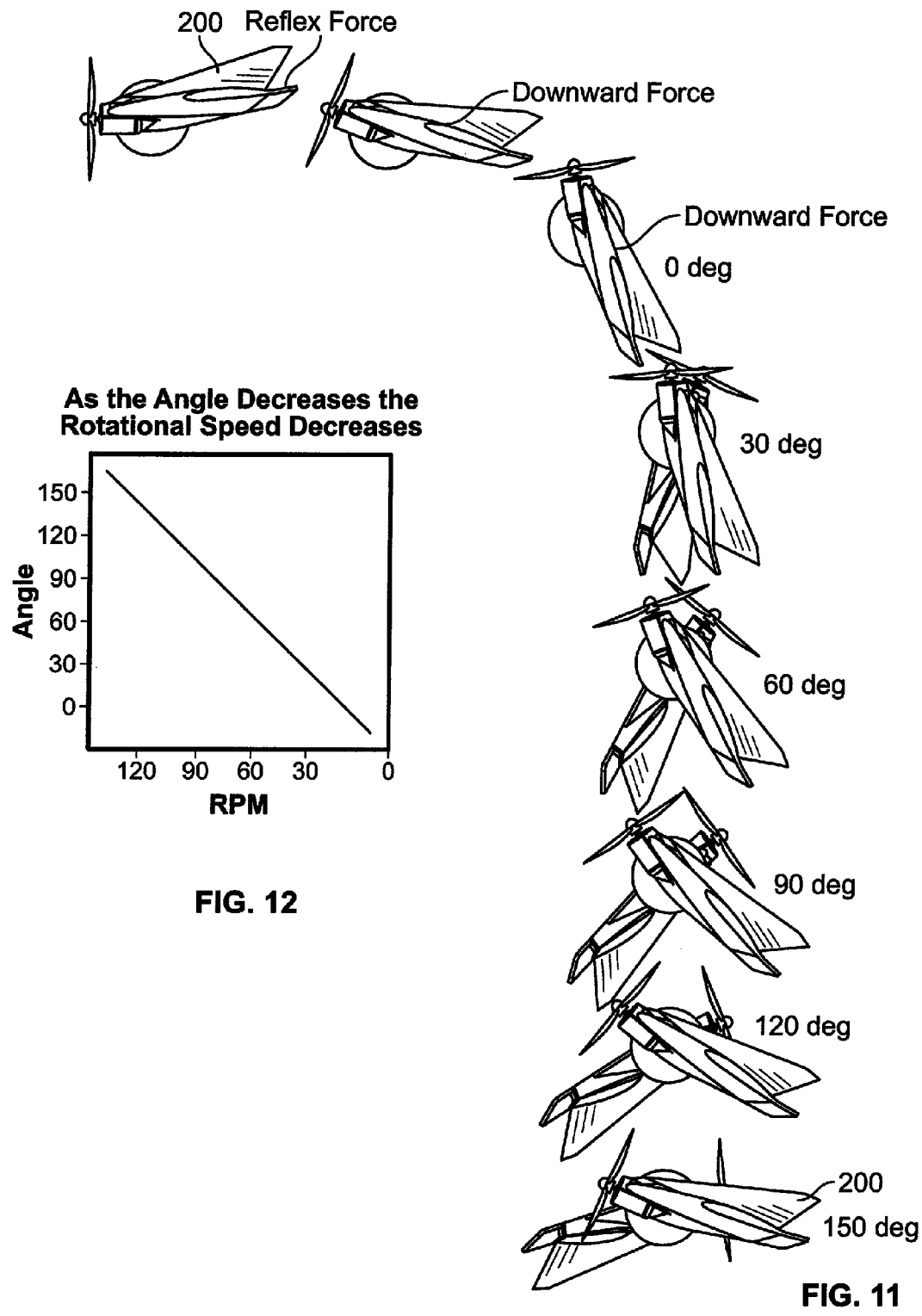
FIG. 11 illustrates the vehicle of FIG. 8 in the transition mode showing the various rotational angle between wings.
FIG. 12 is a graph showing the relation between the angle of the wings and the rotational speed of the wings during the transition between hovering and flying modes.

When assembled, as illustrated in FIGS. 9A and 9B, the vehicle 200 has a flying mode (FIG. 9A) and a hovering mode (FIG. 9B), similar to that was has already been explained. When the wings are rotated and cocked into hovering mode, the wings are about 150° out of alignment with each other. Further shown in FIGS. 10 and 11, in hovering mode, the entire vehicle will spin causing it to lift and hover off of the ground. As soon as the user transitions the wings into a flying mode, this transition period is shown in the breakdown on illustrates in FIGS. 10 and 11 as the degree of alignment for the wings is brought back to zero degrees. While this transition may be controlled transition or instantly is dependent upon the embodiment. In any event it has been observed that as the vehicle transforms from a hovering angle to a flying angle its rotational speed quickly decreases (FIG. 12). At the end of the transformation a downward force acting on the top side of the vehicle acts to force the vehicle into a correct flying orientation. A full tail (horizontal and vertical stabilizer) is often used to compensate against this downward force and keep the vehicle in the correct flying orientation. However, a flying wing or similar vehicles such as provided herein uses a reflex camber 60 angled from the trailing edge of the wing to replace the horizontal stabilizer on the tail.

Figure 13:
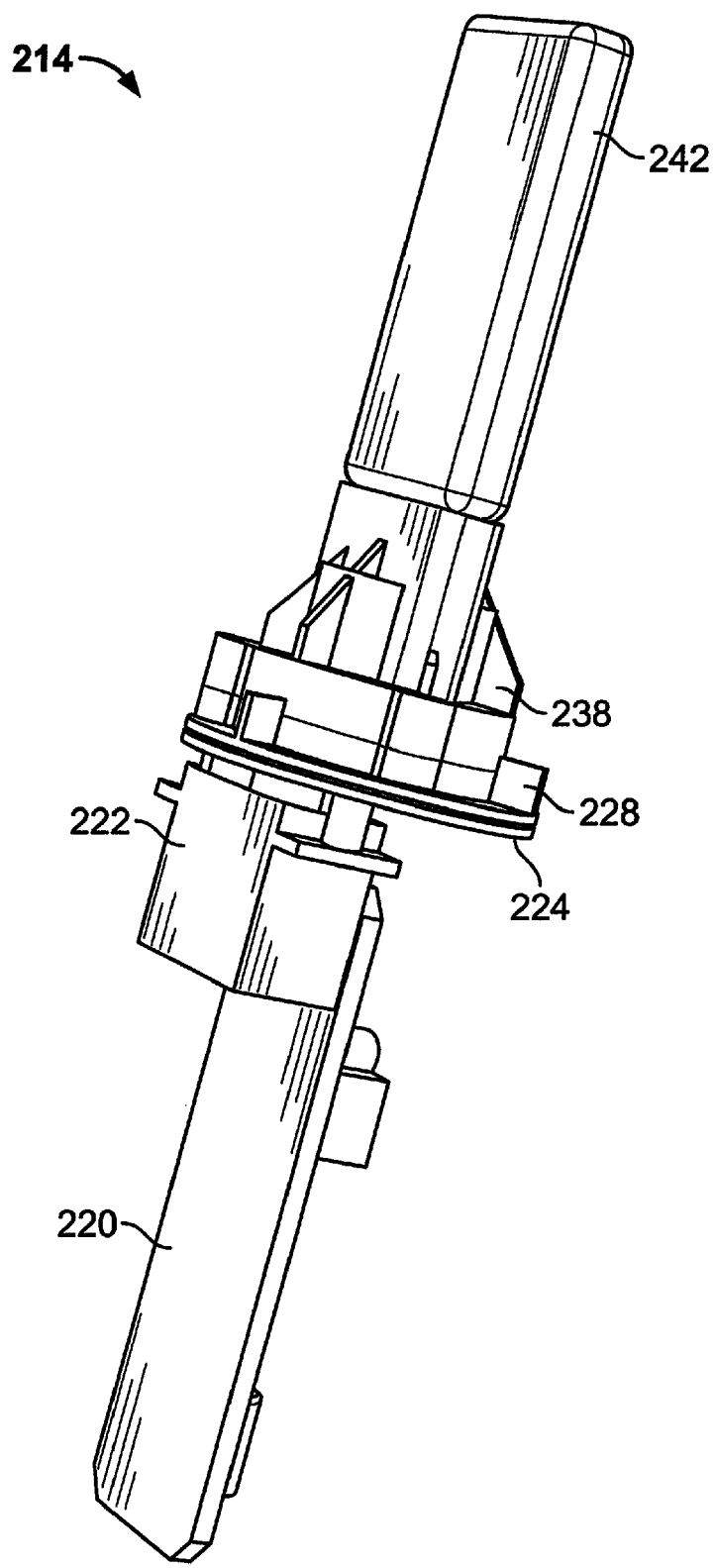
FIG. 13 is a perspective view of the transition assembly.
Figure 14:
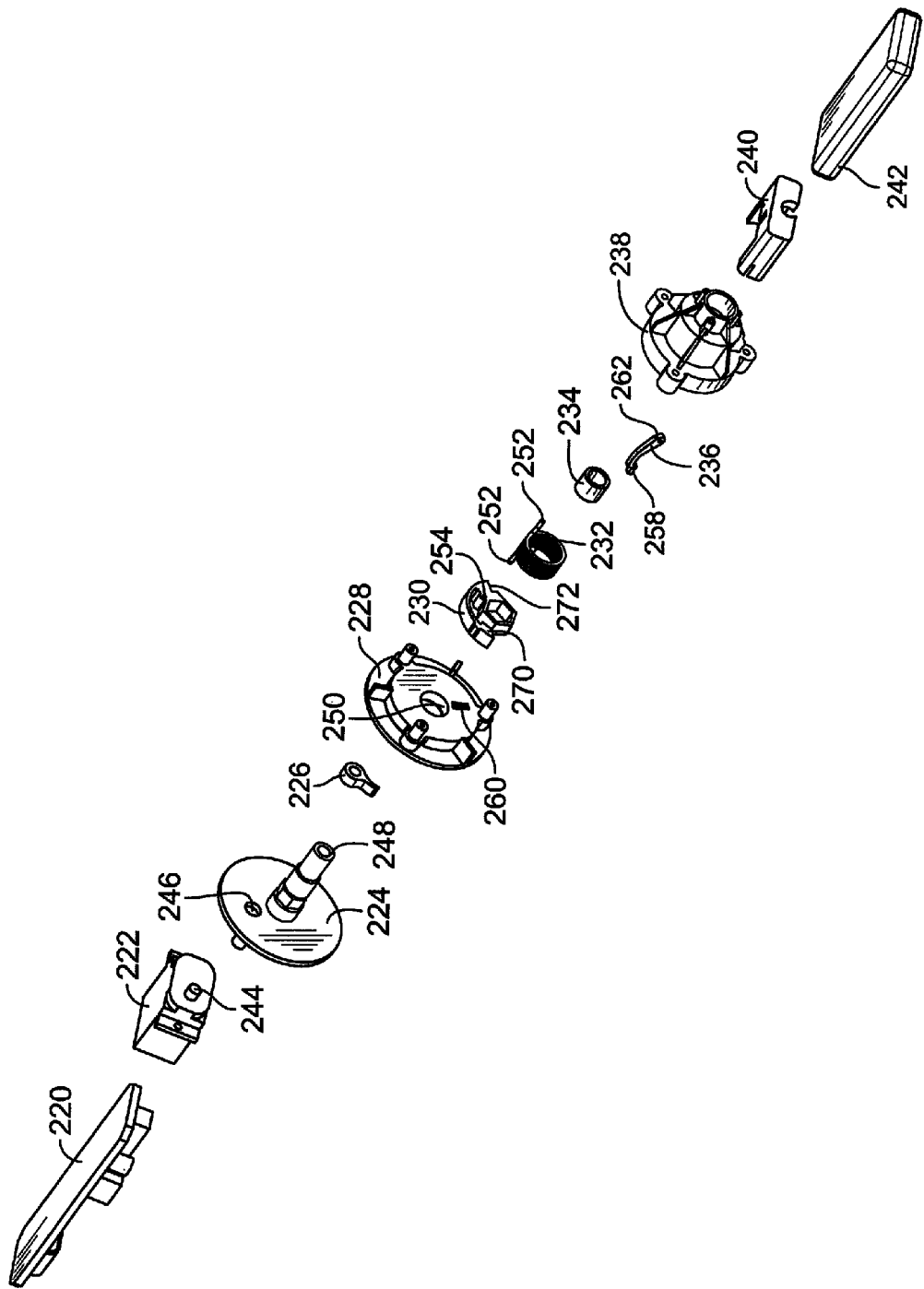
FIG. 14 is an exploded view of FIG. 13.
Figure 15:
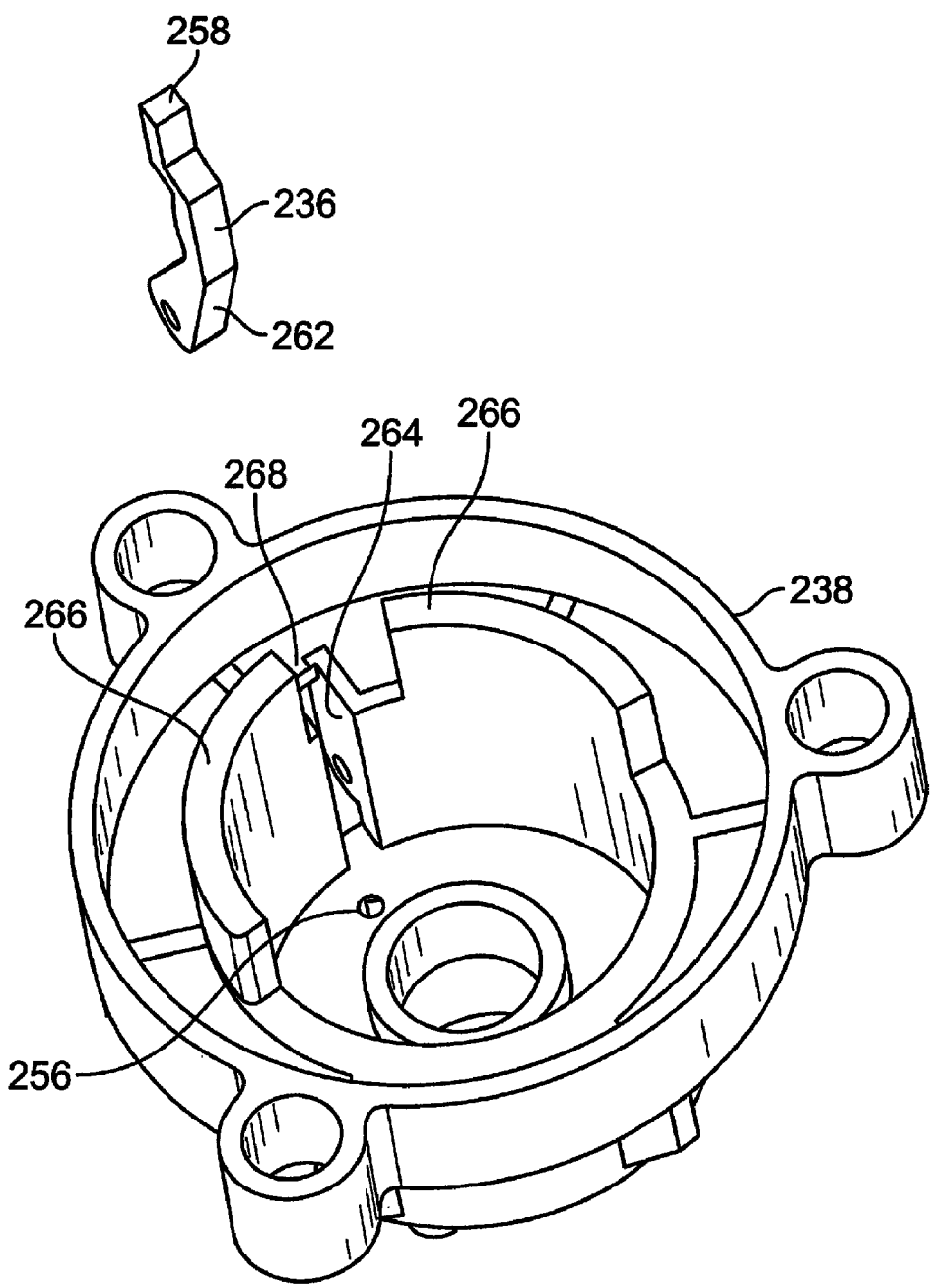
FIG. 15 is a close view of the head cover and trigger pin from the transition assembly of FIG. 13.

To position the wings in the hovering mode, the wings must be rotated and cocked into position. The facilitate this, a transition assembly 214 (illustrated in FIGS. 13 through 15) is employed and will be illustrated and described in greater detail below. The transition assembly 214 includes a PCB board 220, a servo 222, a hex rod plate 224, a cam arm 226, a cam cover 228, a lock stop hex arm 230, a spring 232, a lock nut 234, a trigger pin 236, a head cover 238, a foam insert 240, and a battery 242.

The PCB board 220 controls or activates the servo 222. The servo 222 includes a pin 244 that inserts through an opening 246 on the hex rod plate 224. Secured on the pin 244 on the other side of the hex rod plate 224 is the cam arm 226. When the servo 222 is activated the cam arm 226 will turn. Mounted over the hex rod 248 on the hex rod plate 224 is the cam cover 228. When mounted the hex rod 248 will be positioned trough the aperture 250 on the cam cover 228. This permits the lock stop hex arm 230 to be secured onto the hex rod 248. At this point the cam cover 228 can rotate around the hex rod 248, leaving the lock stop hex arm 230 to be stationary with the hex rod plate 224. The spring 232 includes two ends 252, one of which is inserted into an opening 254 in the lock stop hex arm 230 and the other is inserted into an opening 256 in the head cover 238. A lock nut 234 is then placed over the hex rod 248. The trigger pin 236 includes a first trigger end 258 which is inserted through a trigger opening 260 on the cam cover 228. When inserted there through, the first trigger end 258 can be activated by the activation of the servo 222 and movement of the cam arm 226. The other end 262 of the trigger pin 236 is pivotally secured through a vertical slot 264 in the head cover 228. The vertical slot 264 is also positioned between a pair of flanges 266 that include an arm opening 268 therebetween. The foam insert 240 is used to help stabilize the transition assembly 214 in the wing. Lastly, the battery 242 provides power to the servo 222.

Figure 16:
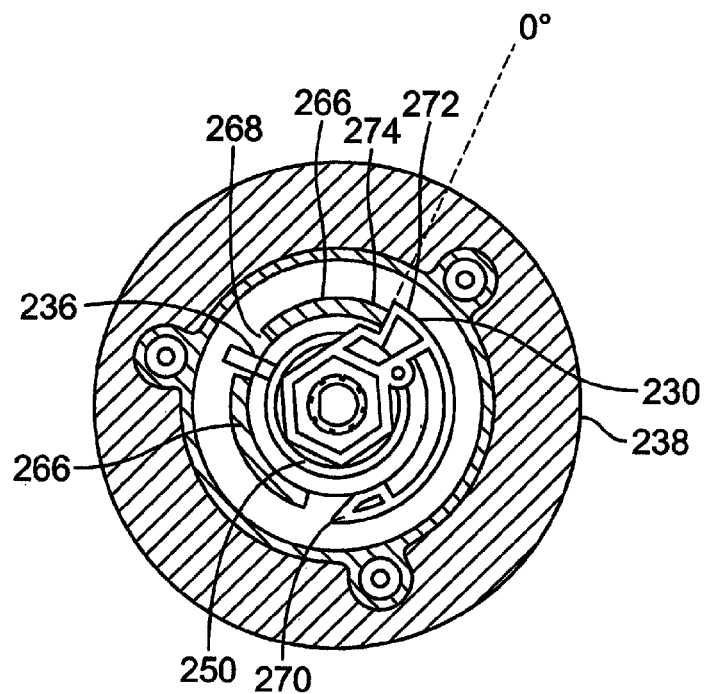
FIG. 16 is a cross sectional view of the transition assembly while in a flying mode.
Figure 17:
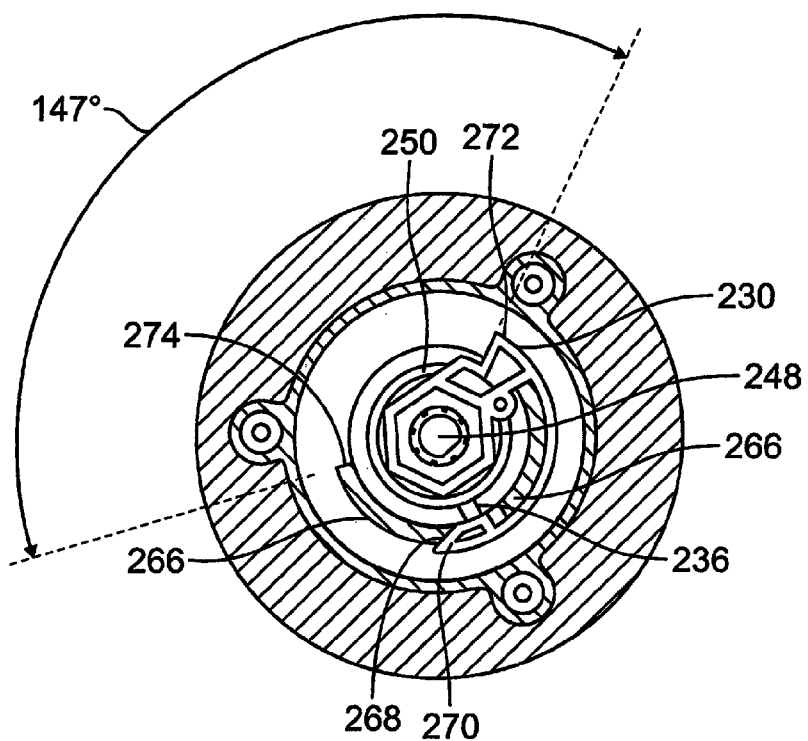
FIG. 17 is a cross sectional view of the transition assembly while in a hovering mode.

When assembled, the cam cover 228 is secured to the head cover 238 such that the two can rotate together with respect to the hex rod plate 224. When rotated by the user to the hovering mode, the head cover 238 will rotate causing the arm 270 on the lock stop hex arm 230 to move over the flange 266 and will lock into the arm opening 268, thereby cocking the wings into position. In the cocked position the spring having its end 252 secured to the head cover 238 and the lock stop hex arm 230 will be twisted and loaded to spring back. FIGS. 16 and 17 illustrate this rotation from the flying mode at zero degrees to the hovering mode at 147°. As noticed, the lock stop hex arm 230 further includes a stop 272 that positioned against edge 274 of the flange 266 at the flying mode to prevent the rotation from moving too far in the opposite direction. To disengage the cocked wings, the servo 222 will engage the cam arm 226 to rotate and push the trigger 236. As the trigger is being pushed it will engage the arm 270 on the lock stop hex arm 230 to move out of the arm opening 268. Once released from the arm opening 268, the spring 232 will move the head cover 238 back towards the flying position. The rotation back to the flying position will cease once the stop 272 engages the edge 274 on the flange 266.

Once in hovering mode, the user can make the vehicle take-off from the ground by placing it on a flat surface or a stand, and applying throttle up to the remote control. Once the vehicle has ascended to the desired altitude, the user can press the transform button on the remote control. When the transition from hover to fly happens the vehicle transforms from spinning with the wings about 150 degrees from each other, to flying with the wings about 0 degrees from each other.

In the hover position, the tail section may be pointing up, down, pulled off (if separated from the fuselage), or no tail at all in the case of a flying wing. The position of the tail is not important for this invention.

It should be further stated the specific information shown in the drawings but not specifically mentioned above may be ascertained and read into the specification by virtue of a simple study of the drawings. Moreover, the invention is also not necessarily limited by the drawings or the specification as structural and functional equivalents may be contemplated and incorporated into the invention without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A flying vehicle comprising:

a pair of wings, each wing having a propeller and a motor for driving the propeller;

a transition assembly partially housed within each of the pair of wings, the transition assembly having ends rotatable with respect to each other, each end of the transition assembly being separately secured to the which the end is housed, the transition assembly having a first position, the first position being defined as having each wing oriented at an angle offset from a substantial horizontal position and in a different direction from the other wing, and wherein when the transition assembly is in the first position and the propellers are rotating, the vehicle spins and will fly in a substantially hovering vertical orientation, the transition assembly having a second position being defined as having each wing oriented to the substantial horizontal position and in a substantially similar direction as the other wing, such that when the transition assembly is in the second position and the propellers are rotating, the vehicle will fly in a substantially horizontal orientation;

a means for mechanically moving the transition assembly from the first position to the second position while the vehicle is in the substantially hovering vertical orientation, such that the vehicle transitions from the substantially hovering vertical orientation to fly in the substantially horizontal orientation;

an elongated tail section extending through the vehicle and having a region near a portion thereof for rotatable connection with the wings, the tail section having a first channel and a second channel, the first channel having a first channel opening to the region and the second channel having a second channel opening to the region; and wherein the transition assembly includes:

a gear meshed to first and second spur gears, the spur gears being separately and partially secured within each wing, wherein the rotation of one wing causes the gear to rotate the other wing in an opposite direction with respect to the one wing;

a flexible band positioned in the first channel and having one end secured through the first channel opening to a portion of the first spur gear and having the other end secured to a wall distal to the first channel opening in the first channel; and a string positioned in the second channel and having one end secured through the second channel opening to a portion of the second spur gear and having the other end secured to a suction cup, the suction cup being capable of being secured to a plate positioned to a wall distal to the second channel opening in the second channel.

2. A flying vehicle comprising:

a pair of wings, each a propeller and a motor for driving the propeller;

a transition assembly partially housed within each of the air of wings, the transition assembly having ends rotatable with respect to each other, each end of the transition assembly being separately secured to the wing in which the end is housed, the transition assembly having a first position, the first position being defined as having each oriented at an angle offset from a substantial horizontal position and in a different direction from the other wing, and wherein when the transition assembly is in the first position and the propellers are rotating, the vehicless and will in a substantially hovering vertical orientation, the transition assembly having a second position being defined as having each wing oriented to the substantial horizontal position and in a substantially similar direction as the other wing, such that when the transition assembly is in the second position and the propellers are rotating, the vehicle will fly in a substantially horizontal orientation;

a means for mechanically moving the transition assembly from the first position to the second position while the vehicle is in the substantially hovering vertical orientation, such that the vehicle transitions from the substantially hovering vertical orientation to fly in the substantially horizontal orientation;

a servo having a pin placed through an aperture defined on a hex rod plate, a cam arm secured to the pin about the aperture on the hex rod plate such that the hex rod plate is captured between the servo and the cam arm, wherein when the servo operates the cam arm turns, a cam cover having an opening mounted over the hex rod plate such that a hex rod defined by the hex rod plate extends through the opening, secured to the hex rod is a lock stop hex arm, wherein the cam cover is rotatable around the hex rod, a spring having two extension ends, one of the extension ends of the spring inserted into a first extension end aperture on the lock stop hex arm, a head cover secured to the hex rod plate, the head cover having a second extension end aperture for receipt of the other extension end on the spring, a trigger pin including a first trigger end, the first trigger end inserted through a trigger opening defined on the cam cover such that the first trigger end is moveable when the servo turns the cam arm, a second trigger end is pivotally secured through a vertical slot defined on the head cover, a pair of flanges positioned on the head cover and extending from the vertical slot to define an arm opening therebetween for receiving a protruding arm defined by the lock stop hex arm, wherein when the transition assembly is moved to the first position the cam cover and head cover rotate about the hex rod plate, such that the protruding arm defined by the lock stop hex arm is placed in the arm opening between the pair of flanges on the head cover and the protruding arm is further positioned against the trigger pin and placing the spring under tension, and wherein when the transition assembly is activated to move to the second position, the servo turns the cam arm pivoting the trigger pin such that it moves the protruding arm out of the arm opening, whereby the spring causes the cam cover and head cover to rotate such that the transition assembly is moved to the second position.

3. The vehicle of claim 2, wherein the lock stop hex arm includes a stop that is positioned against an end of one of the flanges to define the second position.

4. A flying vehicle comprising:

a pair of wings, each wing having a propeller and a motor for driving the propeller;

the transition assembly having a first position defined as having each wing oriented to about 40-90° from the substantial horizontal position and in a different direction from the other wing, such that one wing and the propeller secured thereto is oriented about 80-180° from the other wing, and wherein when the transition assembly is in the first position and the propellers are rotating, the vehicle spins and will fly in a substantially hovering vertical orientation, the transition assembly having a second position being defined as having each wing oriented to the substantial horizontal position and in a substantial similar direction as the other wing, such that when the transition assembly is in the second position and the propellers are rotating, the vehicle will fly in a substantially horizontal orientation; and a means for mechanically moving the transition assembly from the first position to the second position while the vehicle is in the substantially hovering vertical orientation, such that the vehicle transitions from the substantially hovering vertical orientation to fly in the substantially horizontal orientation, and a servo having a pin placed through an aperture defined on a hex rod plate, a cam arm secured to the pin about the aperture on the hex rod plate such that the hex rod plate is captured between the servo and the cam arm, wherein the servo operates the cam arm turns.

5. The vehicle of claim 4, wherein the means for mechanically moving the transition assembly from the first position to the second position includes the means for mechanically moving the transition assembly from the second position to the first position.

6. The vehicle of claim 4, wherein the transition assembly includes:

a servo having a pin placed through an aperture defined on a hex rod plate, a cam arm secured to the pin about the aperture on the hex rod plate such that the hex rod plate is captured between the servo and the cam arm, wherein when the servo operates the cam arm turns, a cam cover having an opening mounted over the hex rod plate such that a hex rod defined by the hex rod plate extends through the opening, secured to the hex rod is a lock stop hex arm, wherein the cam cover is rotatable around the hex rod, a spring having two extension ends, one of the extension ends of the spring is inserted into a first extension end aperture on the lock stop hex arm, a head cover secured to the hex rod plate, the head cover having a second extension end aperture for receipt of the other extension end on the spring, a trigger pin including a first trigger end, the first trigger end inserted through a trigger opening defined on the cam cover such that the first trigger end is moveable when the servo turns the cam arm, a second trigger end is pivotally secured through a vertical slot defined on the head cover, a pair of flanges positioned on the head cover and extending from the vertical slot to define an arm opening therebetween for receiving a protruding arm defined by the lock stop hex arm, wherein when the transition assembly is moved to the first position the cam cover and head cover rotate about the hex rod plate, such that the protruding arm defined by the lock stop hex arm is placed in the arm opening between the pair of flanges on the head cover and the protruding arm is further positioned against the trigger pin and placing the spring under tension, and wherein when the transition assembly is activated to move to the second position, the servo turns the cam arm pivoting the trigger pin such that it moves the protruding arm out of the arm opening, whereby the spring causes the cam cover and head cover to rotate such that the transition assembly is moved to the second position.

7. The vehicle of claim 6, wherein the lock stop hex arm includes a stop that is positioned against an end of one of the flanges to define the second position.

8. The vehicle of claim 4, wherein the transition assembly includes:

a motor mechanism, a gear driven by the motor mechanism in at least a first direction, and a spur gear partially secured within each wing, each spur gear being meshed to the gear such that the motor mechanism when operating rotates the wings in different directions with respect to the other wing.

9. The vehicle of claim 8, wherein the motor mechanism drives the gear in two directions, such that the transition assembly is mechanically movable from the first position to the second position and from the second position to the first position.

10. The vehicle of claim 9 further comprising an elongated tail section extending through the vehicle and having a region near a portion thereof for rotatable connection with the wings.

11. The vehicle of claim 4, wherein each wing includes a vertical stabilizer extending therefrom and further includes a reflex camber extending from a trailing edge of a portion of the wing.

* * * * *